US010108586B2

(12) United States Patent
Snyder et al.

(10) Patent No.: US 10,108,586 B2
(45) Date of Patent: Oct. 23, 2018

(54) PREVIEWS OF ELECTRONIC NOTES

(71) Applicant: MICROSOFT TECHNOLOGY LICENSING, LLC, Redmond, WA (US)

(72) Inventors: Scott H. W. Snyder, Seattle, WA (US); Olga Veselova, Redmond, WA (US); Ronald Di Sandro, Seattle, WA (US); Yu Been Lee, Bellevue, WA (US); Ashwini Purohit, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 533 days.

(21) Appl. No.: 13/918,909

(22) Filed: Jun. 15, 2013

(65) Prior Publication Data

US 2014/0372877 A1    Dec. 18, 2014

(51) Int. Cl.
    *G06F 17/00*    (2006.01)
    *G06F 17/21*    (2006.01)
    *G06F 9/451*    (2018.01)

(52) U.S. Cl.
    CPC ............ *G06F 17/212* (2013.01); *G06F 9/451* (2018.02)

(58) Field of Classification Search
    CPC ............................ G06F 17/241; G06F 17/242
    See application file for complete search history.

(56) References Cited

U.S. PATENT DOCUMENTS

| 6,389,435 B1 * | 5/2002 | Golovchinsky ....... G06F 17/242 715/231 |
| 7,353,453 B1 | 4/2008 | Simmons |
| 7,383,505 B2 | 6/2008 | Shimizu et al. |
| 7,698,644 B2 | 4/2010 | Hawk et al. |
| 2005/0091578 A1 * | 4/2005 | Madan .................. G06F 17/241 715/201 |
| 2005/0278625 A1 * | 12/2005 | Wessling .............. G06F 17/248 715/273 |

(Continued)

FOREIGN PATENT DOCUMENTS

WO    2011100099 A1    8/2011

OTHER PUBLICATIONS

International Search Report and Written Opinion for PCT Application No. PCT/US2014/041247, dated Oct. 16, 2014, 11 pages.

(Continued)

*Primary Examiner* — Howard Cortes
(74) *Attorney, Agent, or Firm* — Merchant & Gould P.C.

(57) ABSTRACT

Embodiments include notes application features including notes page preview and other features, but the embodiments are not so limited. In an embodiment, a computer-based method can be configured to generate a notes page preview based on a source notes page, wherein the notes page preview includes one or more of a title, a thumbnail, and/or a snippet generated from the source notes page. A handheld device of an embodiment includes a notes application interface configured in part to display and dynamically update one or more notes page previews, wherein each notes page preview includes a plurality of preview display areas including a title display area, a thumbnail display area, and/or a snippet display area. Other embodiments are included.

20 Claims, 10 Drawing Sheets

(56) References Cited

U.S. PATENT DOCUMENTS

| | | | | | |
|---|---|---|---|---|---|
| 2005/0289453 | A1* | 12/2005 | Segal | | G06F 1/12 715/203 |
| 2006/0277504 | A1 | 12/2006 | Zinn | | |
| 2006/0294476 | A1* | 12/2006 | Buckley | | G06F 17/30716 715/781 |
| 2008/0104535 | A1* | 5/2008 | DeLine | | G06F 3/0483 715/785 |
| 2008/0114782 | A1* | 5/2008 | Sadovsky | | G06F 17/30014 |
| 2010/0011282 | A1* | 1/2010 | Dollard | | G06F 17/241 715/233 |
| 2010/0058159 | A1* | 3/2010 | May | | G06F 17/30902 715/200 |
| 2010/0077004 | A1* | 3/2010 | Abel | | G09B 5/10 707/781 |
| 2010/0174984 | A1* | 7/2010 | Kobashi | | G06F 17/24 715/243 |
| 2011/0125784 | A1 | 5/2011 | Cocheu et al. | | |
| 2011/0202864 | A1* | 8/2011 | Hirsch | | G06F 3/0482 715/773 |
| 2012/0072866 | A1 | 3/2012 | Imai et al. | | |
| 2012/0110458 | A1 | 5/2012 | Brown et al. | | |
| 2013/0080966 | A1* | 3/2013 | Kikin-Gil | | G06F 3/0483 715/776 |
| 2013/0091240 | A1* | 4/2013 | Auger | | G06F 17/241 709/217 |
| 2013/0095464 | A1* | 4/2013 | Ediger | | G09B 5/125 434/322 |
| 2013/0198600 | A1* | 8/2013 | Lockhart | | G06F 17/241 715/230 |
| 2013/0212492 | A1* | 8/2013 | Chen | | G06Q 10/109 715/753 |
| 2014/0019846 | A1* | 1/2014 | Gilead | | G06F 17/30014 715/234 |
| 2014/0280055 | A1* | 9/2014 | Chang | | G06F 17/30867 707/722 |
| 2014/0330911 | A1* | 11/2014 | Hunter | | H04L 51/046 709/206 |
| 2014/0331126 | A1* | 11/2014 | Hunter | | G06F 17/24 715/256 |
| 2015/0278366 | A1* | 10/2015 | Pilpel | | G06F 17/30867 707/723 |

OTHER PUBLICATIONS

Mistrya, et al., "Intelligent Sticky Notes that can be Searched, Located and can Send Reminders and Messages", In Proceedings of the 13th International Conference on Intelligent user Interfaces, Jan. 13, 2008, 2 pages.

Bian, et al., "PalimPost: Information Convergence Using Sticky Notes", In Proceedings of the Second International Workshop on Web of Things, Jun. 12, 2011, 6 pages.

"Getting Started with Evernote Smart Notebook", Retrieved on: Mar. 5, 2013, Available at: http://evernote.com/getting_started/moleskine/#2, 2 pages.

"Using labels—Gmail Help", Retrieved on: Mar. 5, 2013, Available at: http://support.google.com/mail/bin/answer.py?hl=en&answer=118708, 2 pages.

Altermann, Julia, "Get Organized with Reminders and Notes in Mountain Lion", Published on: Jul. 25, 2012, Available at: http://mac.tutsplus.com/tutorials/os-x/get-organized-with-reminders-and-notes-in-mountain-lion/, 7 pages.

PCT Written Opinion in International Application PCT/US2014/041247, dated Apr. 1, 2015, 6 pgs.

"International Preliminary Report on Patentability Issued in PCT Application No. PCT/US2014/041247", dated Jun. 18, 2015, 7 Pages.

"First Office Action and Search Report Issued in Chinese Patent Application No. 201480034082.X", dated Apr. 13, 2018, 10 Pages.

* cited by examiner

PREVIEWS OF ELECTRONIC NOTES

BACKGROUND

Developers of note taking applications strive to provide intuitive user interfaces to allow users to enter typed text via keyboard or touchscreen, create tables, insert images, and scribe with free-form ink input on a notes page. As the user compiles more and more notes, it can become difficult to distinguish relevant notes from other maybe less relevant notes. Users would like to be able to gain an overview of the contents of one or more notes page while distinguishing each notes page from others simply by looking at a list of relevant notes pages. Unfortunately, a list of notes page titles can only convey so much information and typically cannot provide enough contextual information to identify relevant notes pages from irrelevant ones without opening each individual notes page.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments include notes application features including notes page preview and other features, but the embodiments are not so limited. In an embodiment, a computer-based method can be configured to generate a notes page preview based on a source notes page, wherein the notes page preview includes one or more of a title, a thumbnail, and/or a snippet generated from the source notes page. A handheld device of an embodiment includes a notes application interface configured in part to display and dynamically update one or more notes page previews, wherein each notes page preview includes a plurality of preview display areas including a title display area, a thumbnail display area, and/or a snippet display area. Other embodiments are included.

These and other features and advantages will be apparent from a reading of the following detailed description and a review of the associated drawings. It is to be understood that both the foregoing general description and the following detailed description are explanatory only and are not restrictive of the invention as claimed.

DETAILED DESCRIPTION

Figure 1:
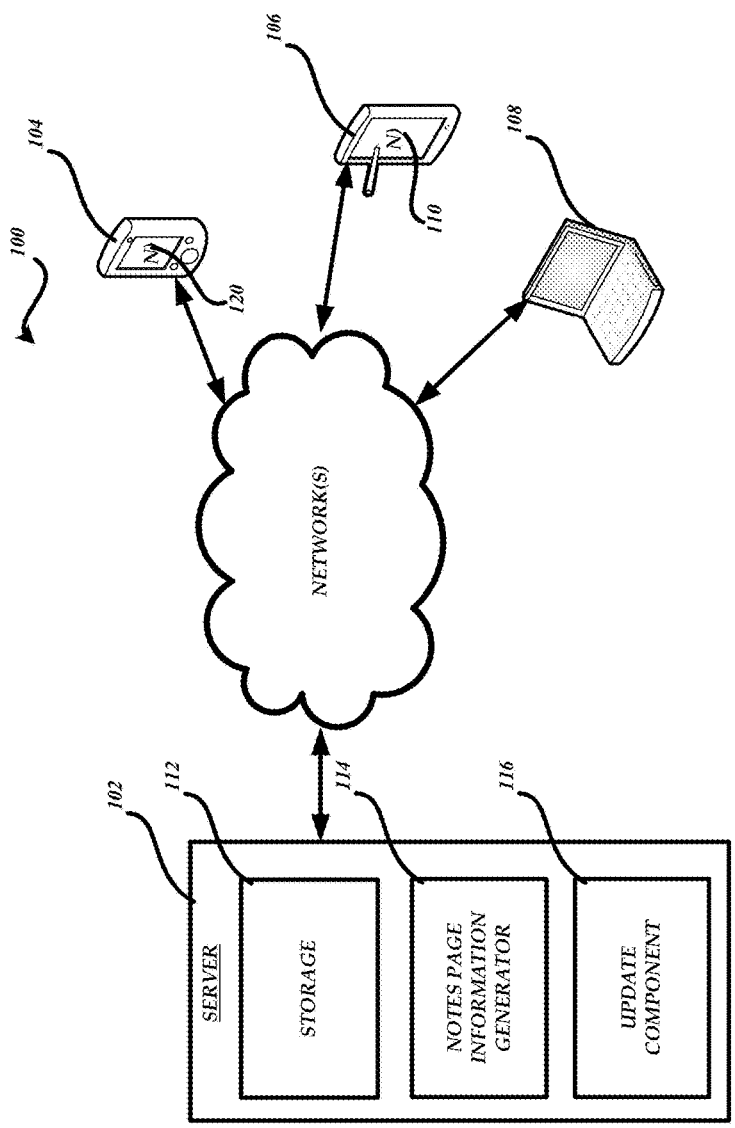
FIG. 1 is a block diagram of an exemplary computing architecture.

FIG. 1 is a block diagram of an exemplary computing and/or communication architecture 100 used in part to provide electronic notes application features including notes page preview features, but is not so limited. As shown in FIG. 1, the exemplary architecture 100 includes at least one server computer 102 coupled to a plurality of example client devices, such as smart phone 104, tablet computer 106, and laptop computer 108. It will be appreciated that the examples used in the description are used illustratively and not intended to limit the scope of the claims. For example, while one server computer is shown, it will be appreciated that complex communication architectures typically employ multiple server computers, networking components, and/or other hardware and software components. Components of the architecture 100 can communicate and interact by way of wired and/or wireless networks depending in part on a particular device type, application type, and/or network type.

For this example, tablet computer 106 includes a notes application 110 including executable code configured in part to provide an interface to display notes page previews for corresponding source notes pages. According to an embodiment, a user is required to be logged-in before using notes page preview features of notes application 110. Executable code of the notes application 110 of one embodiment operates to request source notes page information from the server 102 in part to populate preview display portions or areas of each notes page preview to display on a tablet surface for example. In one embodiment, the server 102 can be configured to pre-generate notes page preview information for the various notes page preview display portions.

Surface-based and/or other types of inputs can be used to navigate over notes page previews. The notes application 110 is configured to provide the user with rich interactive note-taking functionality including the use of notes page previews as a guide, main reference, pivot, and/or overview. The notes application 110 can be used with a variety of device/system types and operating system types. For example, executable code of the notes application 110 can operate with a smartphone to display a plurality of notes page previews grouped by date or some other criteria to enable a user to scroll and/or pan through to identify relevant notes.

The notes application 110 of an embodiment is configured to provide a user view that displays a collection of notes page previews most relevant to the user regardless of a notes page currently in focus or use and/or independent of the location of a notes page (e.g., notebook/section). Code of the notes application 110 of one embodiment can be configured to display a list of notes page previews associated with relevant notes page uses or views across all user notebooks and/or display groupings of notes page previews according to some other criteria (e.g., shared, starred, tagged, etc.). Users can use the notes application 110 features to gain an overview of the contents of a notes page while readily distinguishing notes pages from one another simply by looking at a number of notes page previews that convey rich identification and distinguishing information.

The notes application 110 of one embodiment can be configured to display one or more notes page previews for notes pages associated with open notebooks of a currently logged-in user, wherein the notes page previews include text, images, glyphs, etc. to convey useful information enabling a user to gain a broad notes overview while distinguishing notes pages from one another. For example, the notes application 110 can be configured to display a set or grouping of most recently viewed or used notes pages of a collection of notes pages grouped together according to some grouping or filtering criteria. The notes application 110 can operate to display a variety of notes page preview views, such as views grouped by or that include starred notes, shared notes, tagged notes, etc. according to a particular implementation or view setting. For example, the notes application 110 can operate to display one or more notes page previews associated with starred notes regardless of the view.

Features of the notes application 110 can be implemented as part of an add-in, source, or other component. The notes application 110 of an embodiment can be configured to operate at an O/S operational level. As described below, the notes application 110 allows users to display and navigate among notes page previews to readily locate relevant notes pages using the notes page previews while working with their notes or some other application. The notes page preview functionality of the notes application 110 is configured with complex programming code operable to capture, recall, organize, and/or share notes enabling users to conveniently and intuitively explore, pivot, and/or filter notes collections.

With continuing reference to FIG. 1, the server 102 is communicatively coupled with the client devices/systems running notes application programming code (e.g., smart phones, desktops, tablets, laptops, etc.) as part of providing a variety of interactive and/or other services to clients, but is not so limited. The server 102 of one embodiment comprises an application server operating with a cloud storage system storing collections of user electronic notes as part of providing notes page preview features. The server 102 includes complex programming code or instructions that operate in part to update or refresh notes page previews based in part on changes made to associated source notes pages. The server 102 of an embodiment is configured to generate and/or provide information associated with a source notes page in part to display a notes page preview for the source notes page. For example, the server 102 can operate to pull notes page information from cloud storage to use when providing notes page preview information or services to logged-in users.

The server 102 of an embodiment includes a storage component or storage 112, notes page preview information (NPPI) generator 114, and update component 116. It will be appreciated that the various components can be further combined or provided as stand-alone components. For example, storage 112 can be configured as a stand-alone component rather than being included as part of the server computer. Storage 112 of an embodiment is configured to store information used by the server 102 as part of providing note page previews. The server 102 can respond to client requests to provide information used in part to display notes page previews. The information can be stored locally by each client and used to display notes page previews until updates are received from server 102.

The storage 112 of one embodiment is configured to store notes page information including notes page preview information such as a title, thumbnail, snippet, applied tags, shared information, starred indicators, and/or notes metadata. The stored information can be used in part by the update component 116 to provide up to date notes page previews based in part on corresponding changes made to source notes pages. As changes are made to a source notes page, the NPPI generator 114 can use the new changes to update the preview information which can be pushed to a client. Preview information can be removed for deleted source notes pages or added for new source notes pages. The update component 116 of an embodiment is configured to output update information to the NPPI generator 114 as relevant source notes page information changes.

The NPPI generator 114 of one embodiment can be configured to operate at different times or intervals by pre-generating preview information that is ultimately used in populating preview display areas or portions of relevant notes page previews displayed at the client. Pre-generated preview population information can be stored locally at the client for efficient preview updating. Remote storage, such as storage 112 or some other component for example, can be configured to store notes page information and/or note page preview population information, enabling ready retrieval of the preview information for use in populating one or more groups of one or more notes page previews. A client notes application, browser, or other component can be used to interact with notes pages and notes page previews, wherein notes page previews provide a rich source of information and a navigation utility for users to quickly locate relevant notes.

The update component 116 and/or NPPI generator 114 can periodically, or at some defined interval, store information in storage 112 as part of providing the most up to date notes page previews. For example, the storage 112 can be configured as part of cloud storage allowing the update component 116 to retrieve and store information associated with changes made to source notes pages that may be used to update a display of notes page previews. In one embodiment, the update component 116 can operate to synchronize instances of notes pages for various user devices/systems, such as smart phones, tablet computers, laptop computers, and/or other processor-based devices/systems.

The NPPI generator 114 of an embodiment uses information stored in storage 112 in part to populate portions of each notes page preview for display by a client device/system. In one embodiment, each notes page preview display layout includes a title display area, a snippet display area, a thumbnail display area, and/or a notes page location display area. A client device running a notes application can request preview population information from the NPPI generator 114 when displaying notes page previews. For example, a client device can request that the NPPI generator 114 provide preview information, such as one or more of a notes page title, a notes page snippet, a notes page thumbnail, a starred indicator, one or more applied tags, a shared indicator, and/or a notes page location. Depending on available information, the client can display the available information in one or more display areas of a notes page preview.

The NPPI generator 114 of an embodiment is configured to examine information associated with a source notes page and generate or identify notes page preview information for use in displaying a notes page preview associated with the source notes page. Each displayed notes page preview provides a quick reference of rich notes information that a user can refer to when searching for a corresponding notes page. When available, digital images can provide a powerful tool to convey a large amount of information while using a relatively insignificant amount of preview display area and/or processing resources.

Depending on what a source notes page contains, a notes page preview generated from the source information may include different amounts and/or types of information. In one embodiment, a plurality of properties associated with a source notes page are used in part to manage the population of one or more preview display portions of each notes page preview. For example, the properties may include: a title property, a snippet property, a thumbnail property, a notes page location property, a shared indicator property, an applied tags property, and/or a shared indicator property. The various notes page properties can be used by the server components when managing changes and updates made to source notes pages that may affect corresponding notes page previews. For example, the NPPI generator 114 can use the notes page properties to extract or identify information from the source notes page to use when generating preview information to be displayed in the one or more notes page preview display areas (see FIG. 3B for example).

The NPPI generator 114 of one embodiment uses a preview population algorithm to generate content for one of more of the various display portions. The amount of information is generally dependent on the amount of information contained or associated with each source notes page. As the source notes page evolves with user inputs, the notes page properties can be referred to when determining which display portions require updating. For example, if the user moves the source notes page to a new location, the notes page location property can be referred to update the appropriate notes page display area. As another example, if addition of a new picture or image, or handwritten ink requires updating of a thumbnail display portion, the thumbnail property can be referred to identify the new picture, or optical character recognition (OCR) or ink to text application output, to display in the thumbnail display area.

A page preview display of one embodiment can include a title display area, a snippet display area, a thumbnail display area, a notes page location display area, an applied tag area, a starred indicator, and/or shared indicator. Each one of the page-level properties can be used as part of enabling the user to readily identify relevant notes pages, wherein the more populated properties can provide the user with immediate affirmation of an applicable notes page. Each notes page preview display can be configured in size so as to provide rich legible notes information while not consuming large amounts of processing resources or display space when populating the notes page previews with source notes page information.

As one example, a notes page preview display, including a plurality of preview display areas or portions can be sized at about 1.95 cm in height by about 6.45 cm in width. In one display or view configuration, each notes page preview of a plurality of displayed notes page previews can be sized the same or substantially the same, even if there is little information to display based on the source notes page information. For example, roughly nine page previews can fit vertically depending on the screen/view configuration of a slate-type computer having 1366×768 resolution and standard 96 dots per inch (dpi). The size and/or configuration of the notes page preview displays may vary depending on screen or display resolution, size, dpi, etc.

The NPPI generator 114 of an embodiment uses a number of preview population heuristics to generate information for a notes page preview based in part on aspects of a source note page. For example, a heuristic can be used to generate text from a source notes page to display in the title display portion of a notes page preview (see FIG. 3B for example). A title population heuristic of an embodiment includes: using a source notes page title for the notes preview title display area for source notes pages having titles; using a first number (e.g., 50) of characters associated with the source notes page to generate a title for each notes pages without titles; using "Untitled page" for notes pages without any text or ink; and/or using OCR for inked titles to generate a text title.

The NPPI generator 114 of an embodiment uses a snippet population heuristic to generate information from a source notes page to populate a snippet display area (see FIG. 3B for example) of the notes page preview. As an example, the heuristic can be used to generate text snippets to be displayed as left aligned directly below a notes page title. The snippet population heuristic of an embodiment uses a first number of lines of text (e.g., three lines) of a source notes page containing text, pulling from multiple outlines if necessary, to populate a snippet display area of a corresponding notes page preview. The heuristic of one embodiment uses a first number of lines of text of a source notes page to generate a snippet by: eliminating line breaks before generating a snippet; not adding a delimiter to the snippet; and/or truncating the text at the third line of the snippet with ellipses. If the source notes page does not have a certain number of lines of text (e.g., three lines of text), then the heuristic can operate to use the entirety or some portion of the text to populate the snippet display portion.

The NPPI generator 114 can also use output of an OCR component to generate a snippet for a notes page preview. For example, an OCR application can be run on user ink input in the note page body to generate a text output for use in generating the snippet or some other portion of the notes page preview. If the source notes page contains no text, ink, or other OCR renderable information in the page body, then the snippet can be omitted from the notes page preview, allowing for a larger thumbnail display. Depending on user changes to a source page, the NPPI generator 114 can use output from the update component 116 to update various portions of a notes page preview display, such as the snippet display portion for example.

The NPPI generator 114 of an embodiment uses a thumbnail population heuristic to generate information to populate a thumbnail display area or portion of a notes page preview from a source notes page. For example, the NPPI generator 114 can use the heuristic to identify an image (e.g., .tiff, .jpeg, etc.) of a source page that satisfies some display criteria to use for the thumbnail display area when displaying a notes page preview for the source notes page. The heuristics can be modified and/or applied in different orders, combinations, and/or with other heuristic types. For example, the thumbnail population heuristic can be configured to process and use OCR outputs rather than images based in part on amounts of ink included with a source notes page.

As described above, the server 102 can operate to pre-generate the preview information to be used when populating the notes page previews. The server 102 of one embodiment operates to pre-generate the preview population information limited to a user's recent notes. For example, the server 102 can operate to pull source notes page information for a recent notes list, wherein the recent notes list displays notes page previews limited to temporal interactions with notes pages within a defined time period or other criteria, such as notes viewed or edited today, yesterday, last week, or some other time. The list of notes page previews can be configured in different ways according to a user selection to tailor what's being displayed at any given time. The notes page previews can include information gained from source notes pages located in remote and/or local notebook locations and can be tailored according to the user login credentials or some other identifier or criteria.

The NPPI generator 114 of one embodiment is configured to generate content for the thumbnail display area configured as a right-aligned display portion (e.g., right-aligned squares with dimension of about 1.56 cm by about 1.56 cm). The NPPI generator 114 of an embodiment uses the thumbnail population heuristic to generate information from a source notes page to populate the thumbnail such that for source notes pages that contain multiple images or a single image, the first image identified from top to bottom having a height great than a threshold (e.g., ≥1.56 cm) and a width greater than a threshold (e.g., 1.56 cm) is used as a thumbnail to populate the thumbnail display portion. The NPPI generator 114 of one embodiment shrinks each thumbnail image while maintaining aspect ratio until one dimension reaches one of the thresholds before cropping and displaying in the thumbnail display portion. The thumbnail content can be stored or pulled from the source notes page at the time of display or at some other time.

For source notes pages containing only ink or substantial amounts of ink, a screenshot of the source notes page or ink can be used to generate content for the thumbnail display portion. For example, if a source notes page includes no images or at least one image satisfying the heuristic and/or includes user ink, the NPPI generator 114 can use a screenshot of the user ink or some ink portion to generate content to be displayed in the thumbnail display portion. The NPPI generator 114 of one embodiment operates to use a screenshot of an inked page for the thumbnail content to be displayed in the thumbnail display portion.

As an example, the NPPI generator 114 can use a screenshot of a source notes page to generate the content for the thumbnail portion by: starting from the upper left corner, resizing while maintaining a defined aspect ratio (e.g., to at most 40% of the original page size); and/or; cropping further to a defined thumbnail size (e.g., about 1.56 cm by about 1.56 cm). An inked title may also be included with the thumbnail content. The image of the page ink displayed in the thumbnail display portion can be sized and/or displayed in different configurations in addition to snippet text resulting from any OCR operations on the source notes page.

As described above, depending on the implementation heuristics, the NPPI generator 114 can prioritize the type of content (e.g., image, screenshot, etc.) to be used when populating the thumbnail display portion. For example, an image having a certain size in the source notes page can be given precedence over user ink that is limited to a certain number of lines or an encompassed page area. Metadata, such as image metadata for example, can be used in part to prioritize use of images over OCR output in the thumbnail display portion.

The NPPI generator 114 of one embodiment can be configured to select content for display in one more preview display portions based on whichever user input item appears first on the source notes page body and satisfies one or more population heuristics. For example, a thumbnail populating heuristic can be configured to select the first picture or user ink reached beginning from the a top portion of a source notes page body and scanning from page left to page right to populate a thumbnail display portion. For pages containing no images or ink, the thumbnail can be omitted and a larger area can be provided for the snippet.

The NPPI generator 114 can also be configured to determine or identify source notes page location information that can be used to populate a source notes page location display portion and provide further contextual information for identifying or selecting an appropriate or relevant notes page. For example, when a user is using a recent list view or some other notes page previews view, the displayed notes page previews can be configured to replace the last line of snippet text with notebook and/or section information (e.g., Work>Meeting Notes).

The location information associated with quick notes or other unfiled notes may also be used to populate the source notes page location display portion. Notes page previews can be configured to display additional information as part of providing rich context information to refresh the user's memory when searching for relevant notes. For example, each notes page preview can also be configured to display a starred indicator, a shared page indicator, and/or any applied tags. As an example, displayed starred indicators can be used to remind a user of an important or favorite page.

Notes page previews are configured to load as quickly as possible, even if data may be out of date or missing. If there is an issue loading some portion of a preview (e.g. thumbnail content being generated), other preview information populates as it is synced. Depending in part on the user network connectivity, notes page previews can be updated in real-time or near real-time as the user interacts with the source notes page. Accordingly, changes made to a source notes page may be reflected in the corresponding notes page preview. Preview changes can be pushed to all connected and logged-in devices/systems.

As described above, a notes view can be populated with notes page previews grouped together according to date or some other criteria for any open notebooks. Such a view can be configured to display notes page previews for all of the user's currently open notebooks. It will be appreciated that notes page preview information may be cached and stored locally and updated after logging on. Depending on the user collection, the view can provide a superset of notes pages across many different notes page locations and provide go-to view to see notes that are most likely relevant at any given time. Recent order and/or other preview groupings can vary depending on the implementation.

In an embodiment, a notes page preview view displays groups of chronologically ordered notes pages according to edits and/or views made by a logged in user(s). In one embodiment, page-level edit time metadata is used to track user edit times when populating the list. Users can be provided view options to sort by recently edited to recently viewed notes page, recently viewed to recently edited notes page, only recently edited notes pages, only recently views notes pages, etc. For example, time groupings can include a "Today" group, a "Yesterday" group, an "Earlier this week" group, a "Last week" group, an "Earlier this month" group, a "Last month" group, an "Earlier this year" group, a "A long time ago" group, etc. Each group can be configured to surface and display as soon as the grouping or category includes one or more notes pages.

It will be appreciated that current portable computing devices include the capability of communicating with the server 102 over a cellular network, WiFi network, or some other network or combination of networks (wired and/or wireless). Depending in part on the device type, the particular notes application may be configured to include different UI features and/or notes page preview configurations. In an embodiment, the notes applications 110 and 120 are configured with complex programming code that enables display and interaction with notes page previews. Other aspects of the notes page preview functionality is described herein.

The client devices/systems described herein can be configured with at least one processor, a system memory, and networking components. System memory can include volatile (e.g. random access memory (RAM)), non-volatile (e.g. read-only memory (ROM)), flash memory, etc. System memory can include an operating system, a notes application, and other application programs that provide rich interactive functionality for the respective devices/systems. It will be appreciated that embodiments described herein may also be practiced in conjunction with other operating systems, device/system types, and/or other application programs. As will be appreciated, the client device/systems use the networking functionality to communicate and utilize functionality of remote systems, such as various servers and/or remote storage farms or locations. The client/system uses the processor to process complex programming code associated with the notes preview functionality.

Various embodiments can be used with a number of computer configurations, including hand-held devices, multiprocessor systems, microprocessor-based or programmable consumer electronics, minicomputers, mainframe computers, etc. Various embodiments can be implemented in distributed computing environments using remote processing devices/systems that communicate over one or more communications networks. In a distributed computing environment, program modules or code may be located in both local and remote memory. Various embodiments can utilize system-on-a-chip (SOC) that may include one or more processors, graphics components, communication components, etc. integrated as the SOC including the use of application-specific logic. For example, a SOC can include a central processing unit, a graphics processor, memory, USB controller, power management circuits, wireless radio (s) (WiFi, cellular, etc.), and/or other components. Various embodiments may be implemented as a process or method, a system, a device, and/or computer storage or computer readable storage for example. While a number of embodiments are described, it will be appreciated that other embodiments are available.

Figure 2:
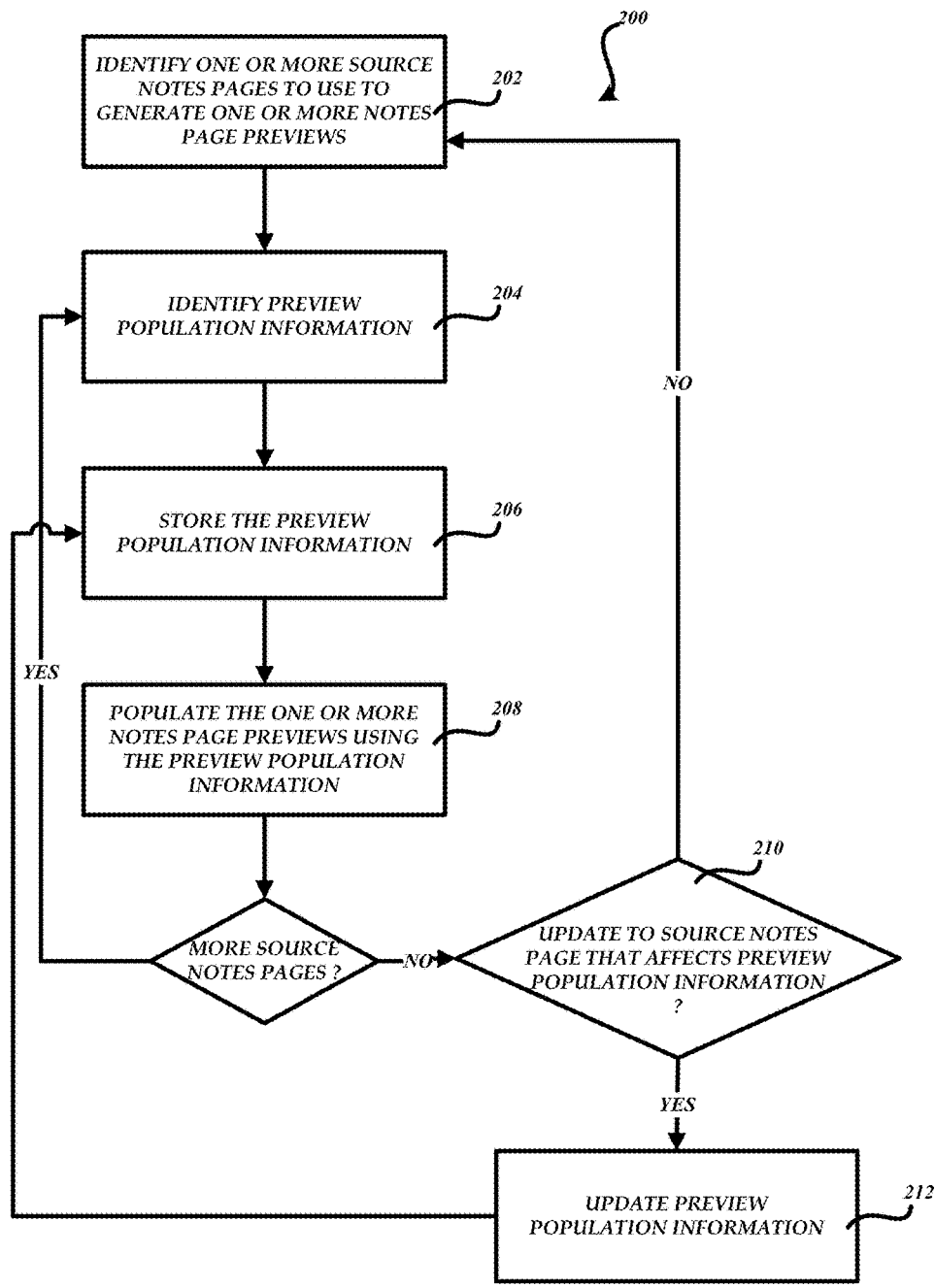
FIG. 2 is a flow diagram depicting an exemplary process of providing one or more notes page previews.

FIG. 2 is a flow diagram depicting an exemplary process 200 of providing one or more notes page previews associated with one or more source notes pages. For example, the process 200 can be used to provide one or more notes page previews populated in a view or other display configuration. The process 200 can be configured to generate a view list of notes page previews displayed as a default view and/or as selected by the user. The process 200 can be used to generate notes page preview information based in part on source notes page information. The notes page previews provide a quick and efficient reference to users enabling for ready identification of relevant notes pages.

The process 200 of an embodiment includes the use of an installed notes application or browser application along with an online and/or local collection of user notes pages. After logging in, the process 200 can be used to push source information associated with a collection of source notes pages to a communicating client for display of one or more notes page previews using a notes application interface. The process 200 can incorporate the use of an electronic computing device, such as a smart phone, tablet computer, laptop, or desktop for example, and complex programming in part to provide notes page preview features and functionality.

With continuing reference to FIG. 2, at 202 the process 200 begins by identifying one or more source notes pages to use for providing one or more notes page previews. For example, the process 200 can use login or other user information to identify a collection of notes pages associated with each user to use to pull information used in part to populate display portions of one or more notes page previews. As described below, a user can use a notes application interface or browser application for example to display a view of notes page previews relevant to the user, whether logged in or not. Each notes page preview of one embodiment is configured with a plurality of preview display areas or portions that can be populated with information associated with a source note page. The notes page previews provide a rich source of information to use when identifying relevant notes or notes pages. The notes page previews are also available to offline users, albeit without all of the update capabilities available to the online users. Cloud storage can include one or more server computers that operate to store and/or synchronize notes page previews.

At 204, for each of the identified or designated source notes pages, the process 200 operates to identify information, referred to as preview population information, associated with each source notes page to use in populating one or more preview display portions of a corresponding notes page preview. The process 200 at 204 of an embodiment uses one or more preview population heuristics to generate preview population information for display using the one or more notes page previews. For example, the process 200 at 204 can be configured to use one or more of a number preview population heuristics to determine, extract, and/or copy preview population information from a source notes page including information for generating and/or populating one or more of: a notes page preview title, a snippet of text for the notes page preview, a notes page preview thumbnail, a source notes page location, a starred indicator, a shared indicator, and/or any applied tags associated with the source notes page.

In one embodiment, the process 200 at 204 operates to pre-generate the preview population information limited to certain source notes pages of a user notes collection. One implementation example uses the process 200 at 204 to generate information for notes page previews limited to open notebooks that include recently or otherwise edited and/or viewed source notes pages. Depending on the notes page preview display layout and the amount of information associated with a particular source notes page, the process 200 can be configured to determine different amounts and/or types of information for use in generating the preview population information for display using the notes page previews.

At 206, the process 200 operates to store the preview information. For example, the notes page preview information can be stored locally and/or remotely and/or include mappings to original source information used in part to populate display portions of each notes page preview. The stored preview population information can be referred to or retrieved for use in a real-time or near real-time display of one or more notes page previews and/or as part of an efficient update process as source notes page information changes. As an example, notes page preview information may map to a title of a source notes page or the title itself may be stored in local and/or remote storage locations. Similarly, depending in part on the size and/or network conditions, a thumbnail image may be generated from a source image and stored locally at the client to reduce an amount of time required to pull down the image.

At 208, the process 200 operates to populate the one or more notes page previews using the preview population information identified or gathered from the source notes page. For example, the process 200 at 208 can operate to provide some or all of the information to use when populating one or more notes page previews after a user logs in to an online service (e.g., ONEDRIVE application) and selects to display a view of recent notes using a notes application interface or a browser for example. As described above, the preview population information can include a variety of information tracked using one or more page-level properties, such as text for a title, text for a snippet, an image for a thumbnail, captured ink for a thumbnail, starred information, shared information, applied tag information, and/or other information useful in population each notes page preview information to provide ready feedback of each notes page's relevance to each user. Each notes page preview can be displayed once all information is downloaded or as each piece of information is generated.

If there are additional source notes pages to process, the process 200 returns to 204 and operates to identify preview population information associated with each additional source notes page. If there are no additional source notes pages to process, the process 200 proceeds to 210 to determine whether an update to a source notes page warrants updating the corresponding notes page preview. For example, a user may have deleted an image or placed a new image on a source notes page that requires updating of a thumbnail. As described above, one or more of the preview population heuristics can be used to determine whether an update affects some display portion of a notes page preview and if a change is warranted.

If there has been an update to a source notes page that affects the notes page preview population information, the process 200 proceeds to 212 and operates to update the preview population information based on the changed, deleted, and/or new source notes page information and returns to 206 to store the updated or modified preview population information. For example, if a user has recently dropped a new image into a source notes page that satisfies a thumbnail population heuristic, the new image can be stored and used for the thumbnail display portion. Likewise, if a user adds new ink to a source notes page, the ink or some portion thereof may be used to generate new snippet content or new thumbnail content for updating the notes page preview.

If there has not been an update to a source notes page that affects the notes page preview population information, the process 200 returns to 202. The process 200 can be run as source notes pages are added, deleted, and/or modified for a user collection. As described above, the process 200 can operate to provide note page preview population information before, after, or while a user is logged in to a service or application. For example, a notes application interface can be configured to request any new or updated note page preview population information before, along with, and/or subsequent to receiving login credentials. While a certain number and order of operations is described for the exemplary flow of FIG. 2, it will be appreciated that other numbers and/or orders can be used according to desired implementations.

Figure 3A:
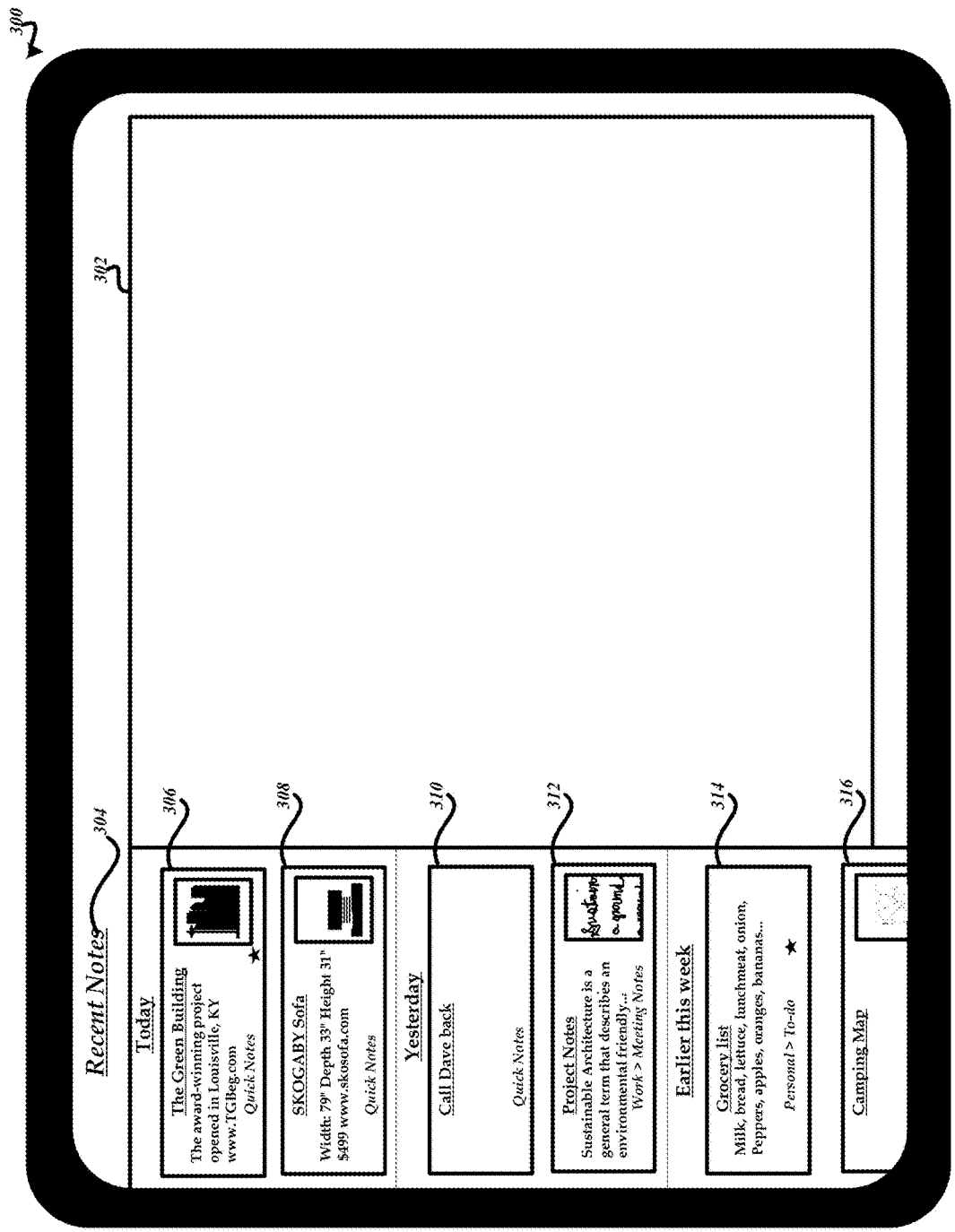
FIGS. 3A-3C depict aspects of an exemplary notes page preview implementation.
Figure 3B:
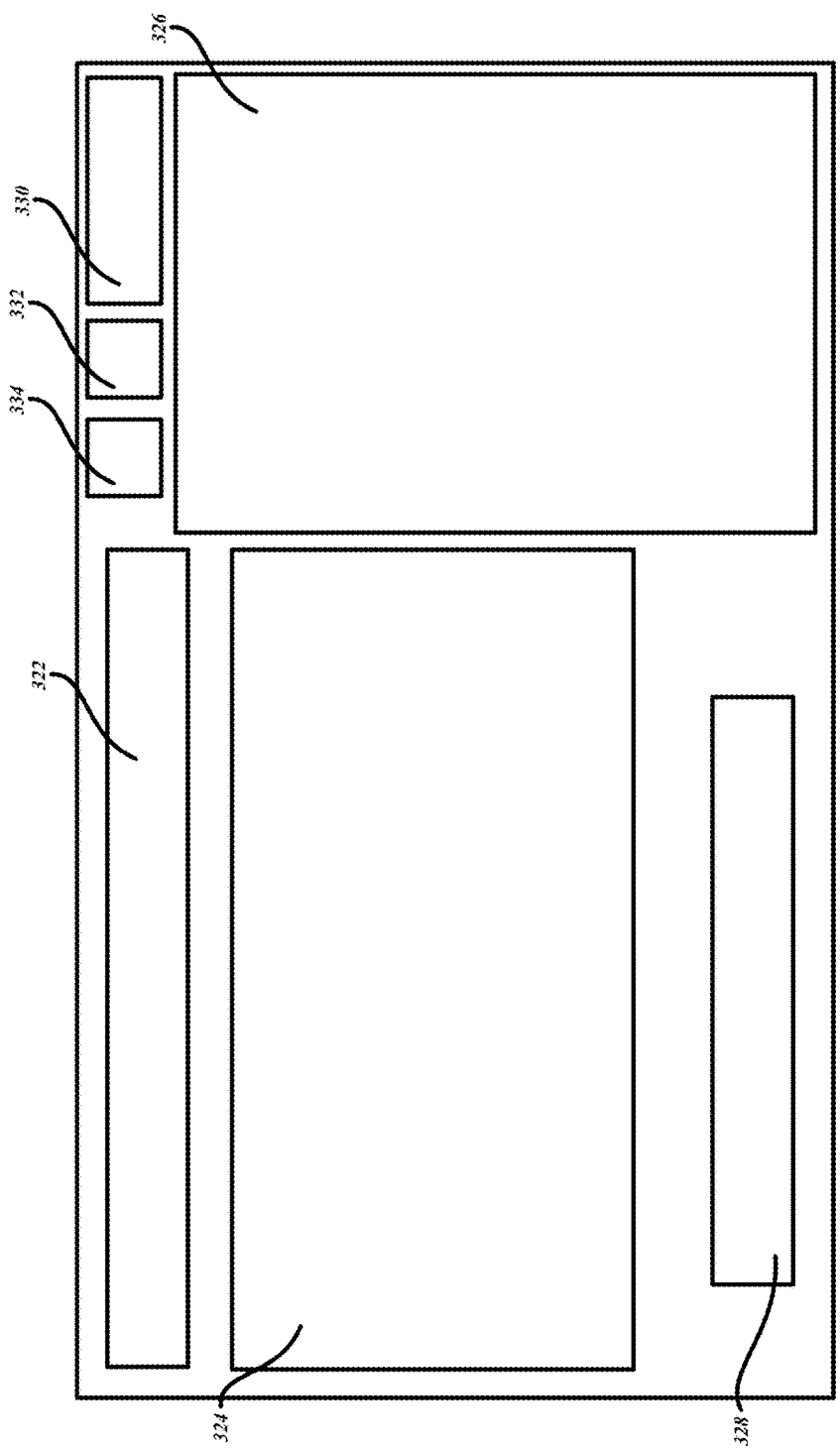
Figure 3C:
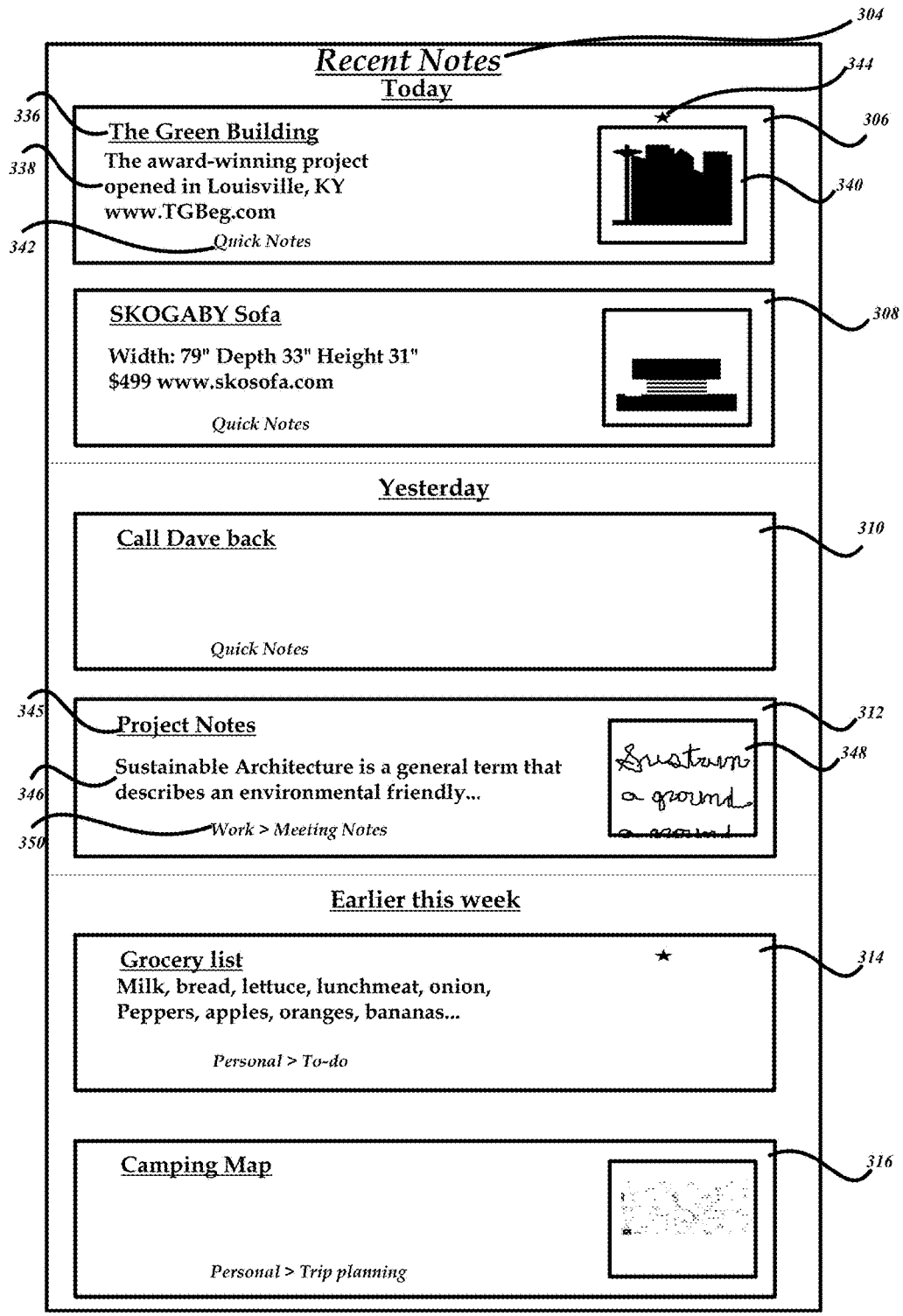

FIGS. 3A-3C depict aspects of an exemplary notes page preview implementation. The implementation example includes use of an installed notes application (e.g., ONENOTE notes application), browser application, or other compatible application operating on a tablet computer (e.g., SURFACE device), smartphone, or other computing device/system.

FIG. 3A depicts an exemplary notes application user interface (UI) 300 configured with complex programming code operable to provide rich functionality associated with electronic notes pages including display of one or more notes page previews. While one example implementation is shown, it will be appreciated that the notes application UI 300 can be configured in different implementations. As shown in FIG. 3A, the notes application UI 300 is currently displaying a blank notes page 302 along with a list 304 of notes page previews 306, 308, 310, 312, 314, and 316. A zoomed in view of the notes page previews 306, 308, 310, 312, 314, and 316 is shown in FIG. 3C.

For this example, notes page previews 306 and 308 are displayed in a first grouping (e.g., "Today" for the current day's notes page previews), notes page previews 310 and 312 are displayed in a second grouping (e.g., "Yesterday" for the yesterday's notes page previews), and notes page previews 314 and 316 are displayed in an "Earlier this week" grouping. In one embodiment, the notes page previews listed in each group correspond with viewed and/or edited notes pages of a user. Thus, the "Today" group displays the notes page previews 306 and 308 that have been edited or viewed on that particular day. Using the information displayed with the notes page previews enables users to efficiently navigate to relevant notes.

Users can use the notes application UI 300 to change the list view 304 such that different groupings of notes page previews are displayed. For example, a user can select a view that corresponds with one or more of starred notes pages, shared notes pages, tagged notes pages, etc. As described below, each of the notes page previews 306-316 includes a plurality of preview display areas or portions, wherein one or more of the preview display portions of each notes page preview can be populated with information associated with a source notes page. The preview information can be updated as the source notes page information evolves.

FIG. 3B depicts an exemplary display layout architecture 320 for a notes page preview. As shown in FIG. 3B, the exemplary display layout architecture 320 includes a title display area or portion 322 to display a title generated from a source notes page, a snippet display area or portion 324 to display a snippet generated from the source notes page, a thumbnail display area or portion 326 to display a thumbnail generated from the source notes page, a source notes page location display area or portion 328 to display a storage location of the source notes page, an applied tags display area 330 to display any applied tags to the source notes page, a starred indicator display area 332 to display importance of the source notes page, and/or a shared indicator display area 334 to display a shared status of the source notes page.

Depending on the source notes page, one or more of the display portions may be populated using information of the source notes page. For example, the thumbnail display 326 may not be populated with content due to a corresponding source notes page not having any images or user ink. Likewise, the snippet display portion 324 may not include snippet text for a source notes page that includes only images or pictures. Many different types of scenarios can be dealt with using preview population heuristics, some examples being described above. Moreover, the various display portions can be arranged according to a desired implementation or preference. For example, a user may prefer to position the thumbnail on the left side of the notes page preview.

Page-level properties associated with each source notes page can be used in part to generate information to be populated in one or more of the preview display portions of each notes page preview. For example, notes page properties can include: a title property, a body property, notebook, section, and/or page location properties, an importance property, a shared property, and/or other property types. In an embodiment, the page-level properties can be used to manage updates of source notes pages such that the most up to date information is captured in the notes page previews.

For example, the page location properties can be used to identify whether source notes page has been saved or moved to a new storage location.

As described above, information can be generated before, during, and/or after a user logs in to an application or service and used to populate one or more notes page previews. To reduce an amount of processing time, notes page preview information may be generated for some defined group or groupings of source notes pages, such as only notes pages edited or viewed by a user during some time or period of time for example. In an embodiment, a dedicated server computer can be used to process a grouping of source notes pages of a user collection and either store information for corresponding notes page previews or generate mappings to the pertinent information. For example, the preview information for the thumbnail display area or portion 326 may be a mapping to a location of a thumbnail image rather than a location of the image in the source notes page.

FIG. 3C depicts a zoomed in view of the exemplary list 304 arranged using the layout of FIG. 3B to display the notes page previews 306-316. As shown for this example, notes page preview 306 includes a title 336 generated from a source notes page and displayed in a title display portion, a snippet 338 generated from the source notes page and displayed in a snippet display portion, a thumbnail 340 generated from the source notes page and displayed in a snippet display portion, a source page location 342 generated from the source notes page and displayed in a source note page location display portion, and a starred indicator 344 displayed in a starred indictor display portion. As shown, a preview population heuristic or algorithm has operated to determine that an image or picture is to be displayed in the notes page preview 306 along with the textual snippet 338 associated with the source notes page.

No information is displayed in the thumbnail display portion of the notes page preview 310 based on an examination of an associated source notes page. Notes page preview 312 includes a title 345 generated from an associated source notes page and displayed in a title display portion, a snippet 346 generated from ink contained in the source notes page and displayed in a snippet display portion, a thumbnail 348 generated from ink contained in the source notes page and displayed in a thumbnail display portion, a source page location 350 generated from the source notes page and displayed in a source note page location display portion. As described above, a heuristic can be used on page ink to populate one or more display portions of the notes page preview 312, such as the title, snippet, and/or thumbnail display portions.

As shown in FIG. 3C, the notes page previews are pulled from source notes pages stored in various storage locations and grouped according to temporal use information, such as by user edit times or view times. Depending on the device/system type, different types of input can be used to navigate through the notes page previews. For example, a swipe gesture can be used to scroll through a number of notes page previews. As another example, tapping or clicking on a notes page preview can cause code to execute and display the corresponding source notes page in a portion of a notes application interface or other interface. User input controls can be configured according to a device/system type and/or user preferences. Other implementations are configurable and the examples and embodiments described herein are not intended to limit the scope of the claims.

Figure 4:
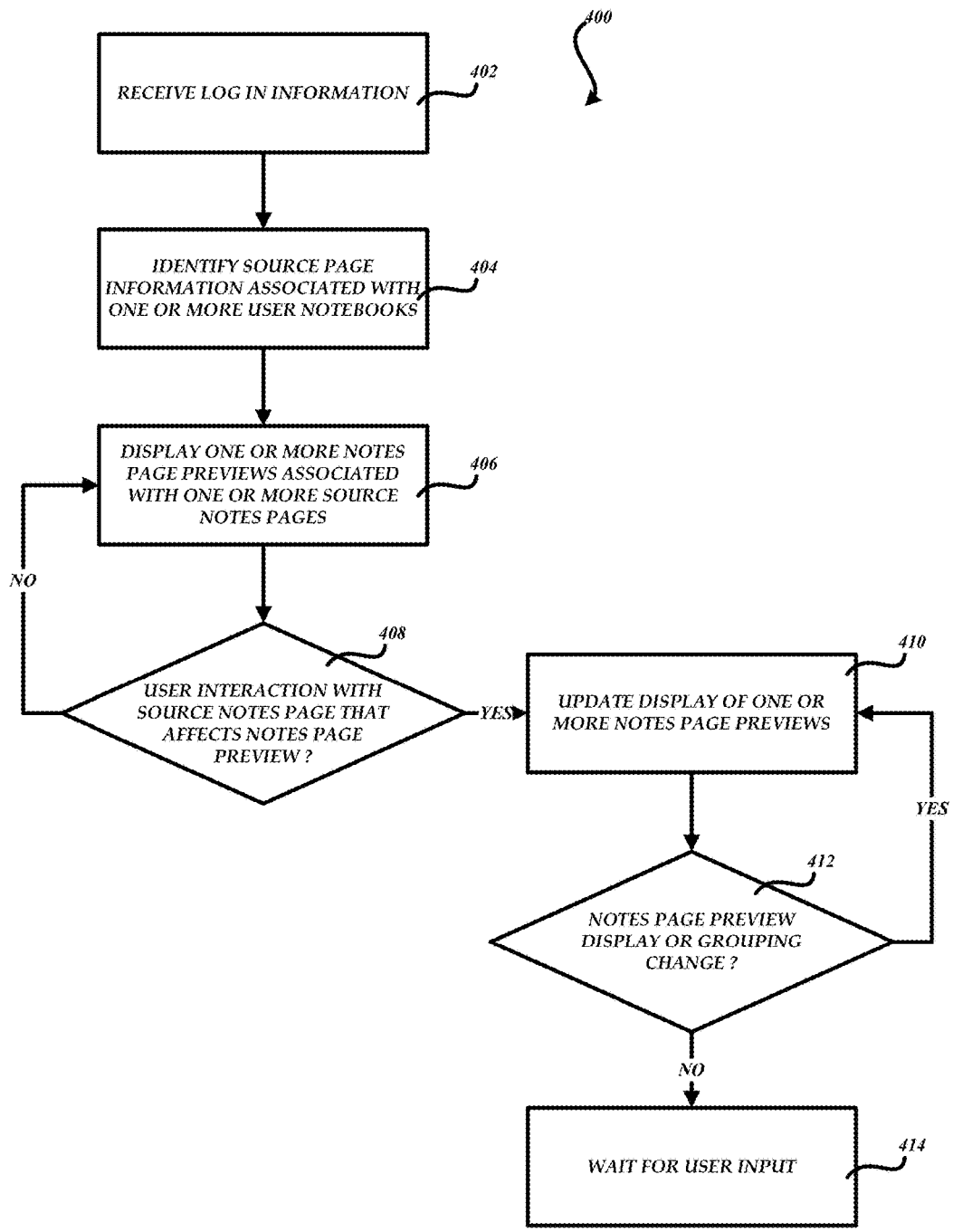
FIG. 4 is a flow diagram depicting an exemplary process of using one or more notes page previews while a user interacts with a notes application or other interface.

FIG. 4 is a flow diagram depicting an exemplary process 400 of using one or more notes page previews while a user interacts with a notes application or other interface. At 402, the process 400 operates to receive login information associated with a user logging in to use features of a notes application or service. A notes application service of an embodiment is configured to manage the population of one or more notes page previews with information gathered from one or more corresponding source notes pages. At 404, the process 400 operates to gather or identify source page information associated with one or more user notebooks to be used when populating notes page previews. For example, the process 400 can use a notes application service and a user identity to gather information from a collection of user notebooks to use when populating display portions of each notes page preview.

At 406, the process 400 operates to use a notes application interface or other component to display one or more notes page previews associated with one or more source notes pages of a collection of source notes pages. In one embodiment, the process 400 at 406 is configured to group notes page previews in one or more groups, wherein each group is based on a category or other criteria and may include one or note notes page previews generated based in part on user edits of any corresponding source notes pages. As described above, different types of heuristics or population algorithms can be used to populate notes page previews with information gathered from corresponding source notes pages.

If the user has not interacted with a source page to affect the information to be displayed in the notes page preview at 408, the process 400 returns to 406. If the user has interacted with a source notes page which affects information to be displayed in the notes page preview at 408, the process 400 proceeds to 410 and updates the displays of one or more notes page previews in accordance with the user interaction with the source notes page. For example, a user may have deleted or added an image to a source notes page which requires updating of the thumbnail display portion of a notes page preview based in part on one or more preview population heuristics.

As the surface of a source notes page is modified, one or more preview population heuristics can be used to determine whether some portion of a notes preview should be updated and thereby provide rapid feedback to the user. As another example, inking and/or other types of user input associated with a source notes page may also affect updating of one or more notes page preview display portions, such as an OCR generated thumbnail or snippet for display. The process 400 can operate to monitor updates or modifications to relevant source notes pages and/or update notes page preview information as soon as practicable or according to some defined time or interval, but is not so limited.

At 412, the process 400 operates to determine whether the user has modified how the notes page previews are to be displayed or grouped. For example, the process 400 at 412 can use user input associated with a selection of a view or filter to be used when displaying a plurality of notes page previews organized according to some order (e.g., temporal based on day and/or time) and/or type (e.g., starred, shared, etc.). If the user has not modified the notes page preview view at 412, the process 400 proceeds to 414 and waits for user input.

If the user has modified the notes page preview view at 412, the process 400 returns to 410 and updates the display of one or more notes page previews corresponding to the new view or grouping. For example, a user can use a dropdown filter to select notes page preview views or view groupings according to one or more of importance and/or other status, whether a notes page preview includes OCR text, an image, and/or some other item or object. The process 400 tracks the fact that preview information generated for display in the notes page previews may change as a user interacts with one or more source notes pages and/or when a user modifies the notes page preview view or view grouping. While a certain number and order of operations is described for the exemplary flow of FIG. 4, it will be appreciated that other numbers and/or orders can be used according to desired implementations.

It will be appreciated that various features described herein can be implemented as part of a processor-driven computer environment including hardware and software components. Also, while certain embodiments and examples are described above for illustrative purposes, other embodiments are included and available, and the described embodiments should not be used to limit the claims. Suitable programming means include any means for directing a computer system or device to execute steps of a process or method, including for example, systems comprised of processing units and arithmetic-logic circuits coupled to computer memory, which systems have the capability of storing in computer memory, which computer memory includes electronic circuits configured to store data and program instructions or code.

An exemplary computer program product is useable with any suitable data processing system. While a certain number and types of components are described above, it will be appreciated that other numbers and/or types and/or configurations can be included according to various embodiments. Accordingly, component functionality can be further divided and/or combined with other component functionalities according to desired implementations. The term computer readable media as used herein can include computer storage media or computer storage. The computer storage of an embodiment stores program code or instructions that operate to perform some function. Computer storage media can include volatile and nonvolatile, removable and non-removable media implemented in any method or technology for storage of information, such as computer readable instructions, data structures, program modules, etc.

System memory, removable storage, and non-removable storage are all computer storage media examples (i.e., memory storage.). Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by a computing device. Any such computer storage media may be part of a device or system. By way of example, and not limitation, communication media may include wired media such as a wired network or direct-wired connection, and wireless media such as acoustic, RF, infrared, and other wireless media.

The embodiments and examples described herein are not intended to be limiting and other embodiments are available. Moreover, the components described above can be implemented as part of networked, distributed, and/or other computer-implemented environment. The components can communicate via a wired, wireless, and/or a combination of communication networks. Network components and/or couplings between components of can include any of a type, number, and/or combination of networks and the corresponding network components which include, but are not limited to, wide area networks (WANs), local area networks (LANs), metropolitan area networks (MANs), proprietary networks, backend networks, cellular networks, etc.

Client computing devices/systems and servers can be any type and/or combination of processor-based devices or systems. Additionally, server functionality can include many components and include other servers. Components of the computing environments described in the singular tense may include multiple instances of such components. While certain embodiments include software implementations, they are not so limited and encompass hardware, or mixed hardware/software solutions.

Terms used in the description, such as component, module, system, device, cloud, network, and other terminology, generally describe a computer-related operational environment that includes hardware, software, firmware and/or other items. A component can use processes using a processor, executable, and/or other code. Exemplary components include an application, a server running on the application, and/or an electronic communication client coupled to a server for receiving communication items. Computer resources can include processor and memory resources such as: digital signal processors, microprocessors, multi-core processors, etc. and memory components such as magnetic, optical, and/or other storage devices, smart memory, flash memory, etc. Communication components can be used to communicate computer-readable information as part of transmitting, receiving, and/or rendering electronic communication items using a communication network or networks, such as the Internet for example. Other embodiments and configurations are included.

Figure 5:
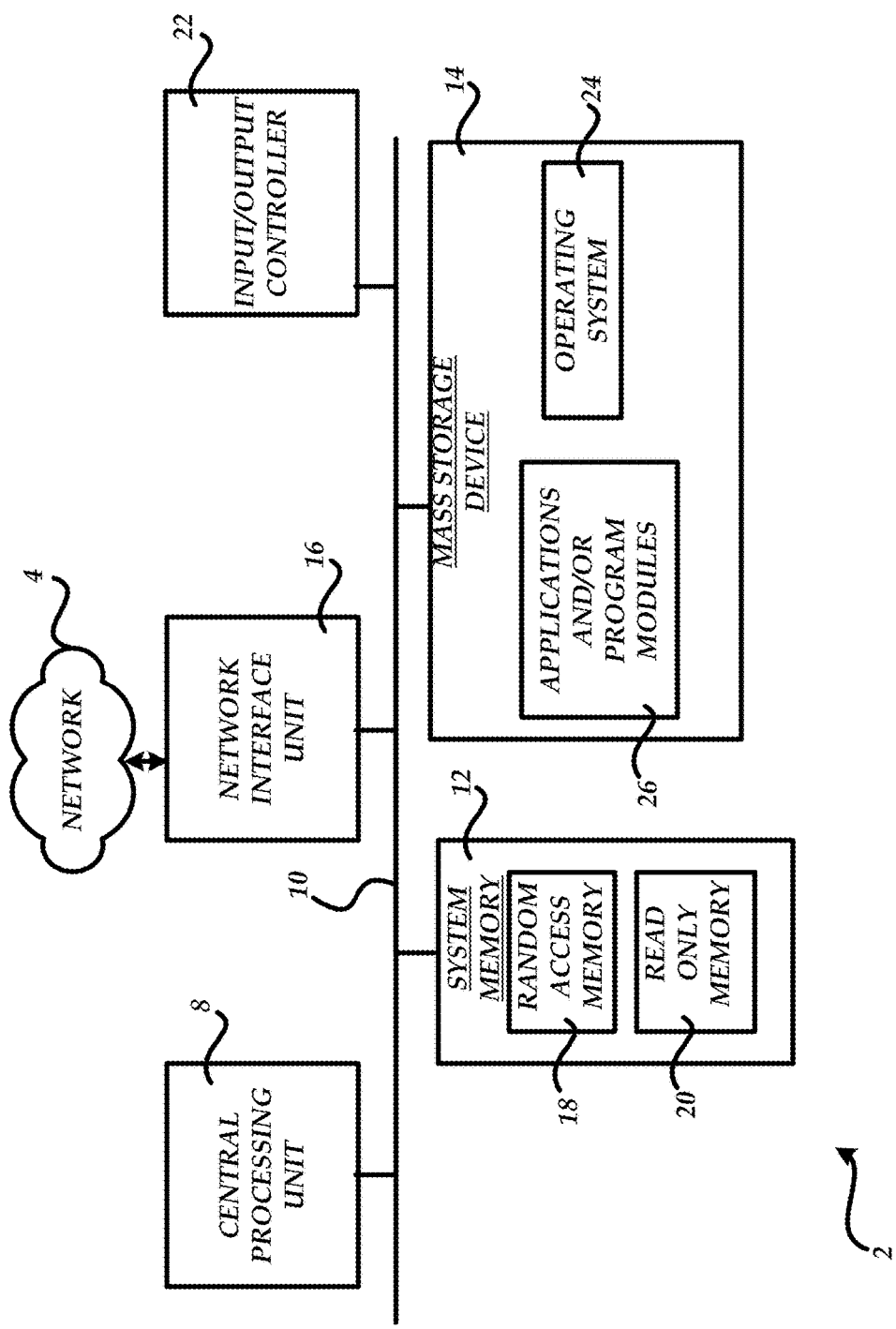
FIG. 5 is a block diagram illustrating an exemplary computing environment for implementation of various embodiments.

Referring now to FIG. 5, the following discussion is intended to provide a brief, general description of a suitable computing environment in which embodiments may be implemented. While described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that other computer system configurations can be used, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

As shown in FIG. 5, computer 2 comprises a general purpose server, desktop, laptop, handheld, or other type of computer capable of executing one or more application programs including a notes application or other application that includes notes page preview functionality. The computer 2 includes at least one central processing unit 8 ("CPU"), a system memory 12, including a random access memory 18 ("RAM") and a read-only memory ("ROM") 20, and a system bus 10 that couples the memory to the CPU 8. A basic input/output system containing the basic routines that help to transfer information between elements within the computer, such as during startup, is stored in the ROM 20. The computer 2 further includes a mass storage device 14 for storing an operating system 24, application programs, and other program modules/resources 26.

The mass storage device 14 is connected to the CPU 8 through a mass storage controller (not shown) connected to the bus 10. The mass storage device 14 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed or utilized by the computer 2.

According to various embodiments, the computer 2 may operate in a networked environment using logical connections to remote computers through a network 4, such as a local network, the Internet, etc. for example. The computer 2 may connect to the network 4 through a network interface unit 16 connected to the bus 10. It should be appreciated that the network interface unit 16 may also be utilized to connect to other types of networks and remote computing systems. The computer 2 may also include an input/output controller 22 for receiving and processing input from a number of other devices, including a keyboard, mouse, etc. (not shown). Similarly, an input/output controller 22 may provide output to a display screen, a printer, or other type of output device.

As mentioned briefly above, a number of program modules and data files may be stored in the mass storage device 14 and RAM 18 of the computer 2, including an operating system 24 suitable for controlling the operation of a networked personal computer, such as the WINDOWS operating systems from MICROSOFT CORPORATION of Redmond, Wash. The mass storage device 14 and RAM 18 may also store one or more program modules. In particular, the mass storage device 14 and the RAM 18 may store application programs, such as word processing, spreadsheet, drawing, e-mail, and other applications and/or program modules, etc.

Figure 6A:
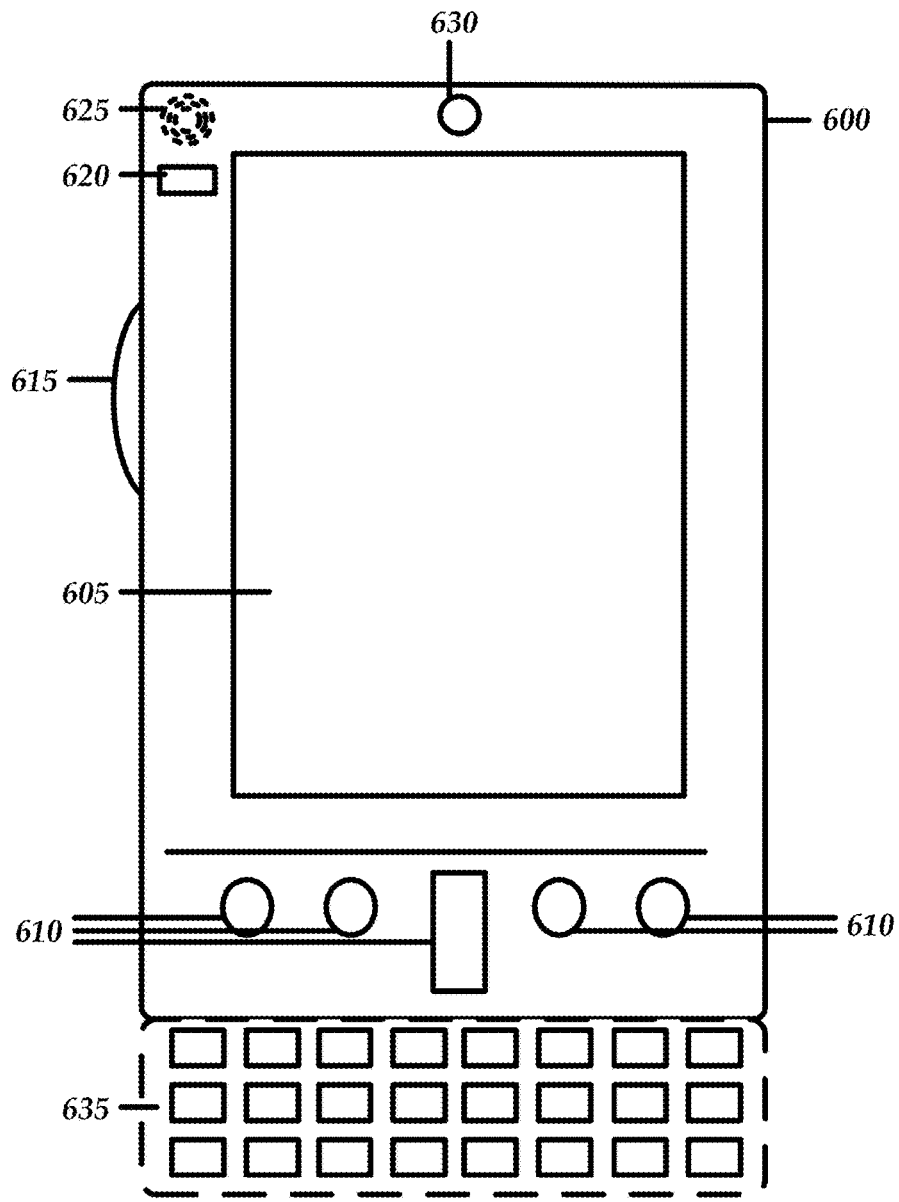
FIGS. 6A-6B illustrate a mobile computing device with which embodiments may be practiced.
Figure 6B:
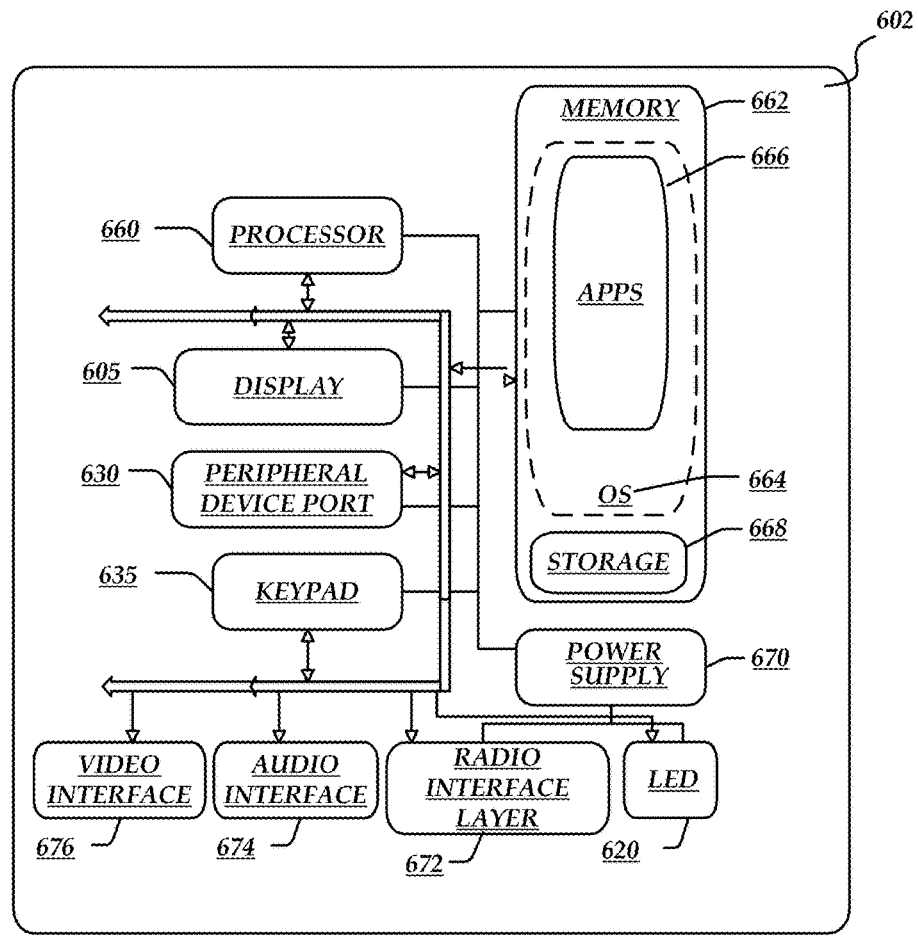

FIGS. 6A-6B illustrate a mobile computing device 600, for example, a mobile telephone, a smart phone, a tablet personal computer, a laptop computer, and the like, with which embodiments may be practiced. With reference to FIG. 6A, one embodiment of a mobile computing device 600 for implementing the embodiments is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display). If included, an optional side input element 615 allows further user input. The side input element 615 may be a rotary switch, a button, or any other type of manual input element. In alternative embodiments, mobile computing device 600 may incorporate more or less input elements. For example, the display 605 may not be a touch screen in some embodiments. In yet another alternative embodiment, the mobile computing device 600 is a portable phone system, such as a cellular phone. The mobile computing device 600 may also include an optional keypad 635. Optional keypad 635 may be a physical keypad or a "soft" keypad generated on the touch screen display. In various embodiments, the output elements include the display 605 for showing a graphical user interface (GUI), a visual indicator 620 (e.g., a light emitting diode), and/or an audio transducer 625 (e.g., a speaker). In some embodiments, the mobile computing device 600 incorporates a vibration transducer for providing the user with tactile feedback. In yet another embodiment, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one embodiment of a mobile computing device. That is, the mobile computing device 600 can incorporate a system (i.e., an architecture) 602 to implement some embodiments. In one embodiment, the system 602 is implemented as a "smart phone" capable of running one or more applications (e.g., browser, e-mail, calendaring, contact managers, messaging clients, games, and media clients/players). In some embodiments, the system 602 is integrated as a computing device, such as an integrated personal digital assistant (PDA) and wireless phone.

One or more application programs 666, including a notes application, may be loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. The system 602 also includes a non-volatile storage area 668 within the memory 662. The non-volatile storage area 668 may be used to store persistent information that should not be lost if the system 602 is powered down. The application programs 666 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600.

The system 602 has a power supply 670, which may be implemented as one or more batteries. The power supply 670 might further include an external power source, such as an AC adapter or a powered docking cradle that supplements or recharges the batteries. The system 602 may also include a radio 672 that performs the function of transmitting and receiving radio frequency communications. The radio 672 facilitates wireless connectivity between the system 602 and the "outside world," via a communications carrier or service provider. Transmissions to and from the radio 672 are conducted under control of the operating system 664. In other words, communications received by the radio 672 may be disseminated to the application programs 666 via the operating system 664, and vice versa.

The visual indicator 620 may be used to provide visual notifications and/or an audio interface 674 may be used for producing audible notifications via the audio transducer 625. In the illustrated embodiment, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. In accordance with embodiments, the microphone may also serve as an audio sensor to facilitate control of notifications, as will be described below. The system 602 may further include a video interface 676 that enables an operation of an on-board camera 630 to record still images, video stream, and the like.

A mobile computing device 600 implementing the system 602 may have additional features or functionality. For example, the mobile computing device 600 may also include additional data storage devices (removable and/or non-removable) such as, magnetic disks, optical disks, or tape. Such additional storage is illustrated in FIG. 6B by the non-volatile storage area 668.

Data/information generated or captured by the mobile computing device 600 and stored via the system 602 may be stored locally on the mobile computing device 600, as described above, or the data may be stored on any number of storage media that may be accessed by the device via the radio 672 or via a wired connection between the mobile computing device 600 and a separate computing device associated with the mobile computing device 600, for example, a server computer in a distributed computing network, such as the Internet. As should be appreciated such data/information may be accessed via the mobile computing device 600 via the radio 672 or via a distributed computing network. Similarly, such data/information may be readily transferred between computing devices for storage and use according to well-known data/information transfer and storage means, including electronic mail and collaborative data/information sharing systems.

Figure 7:
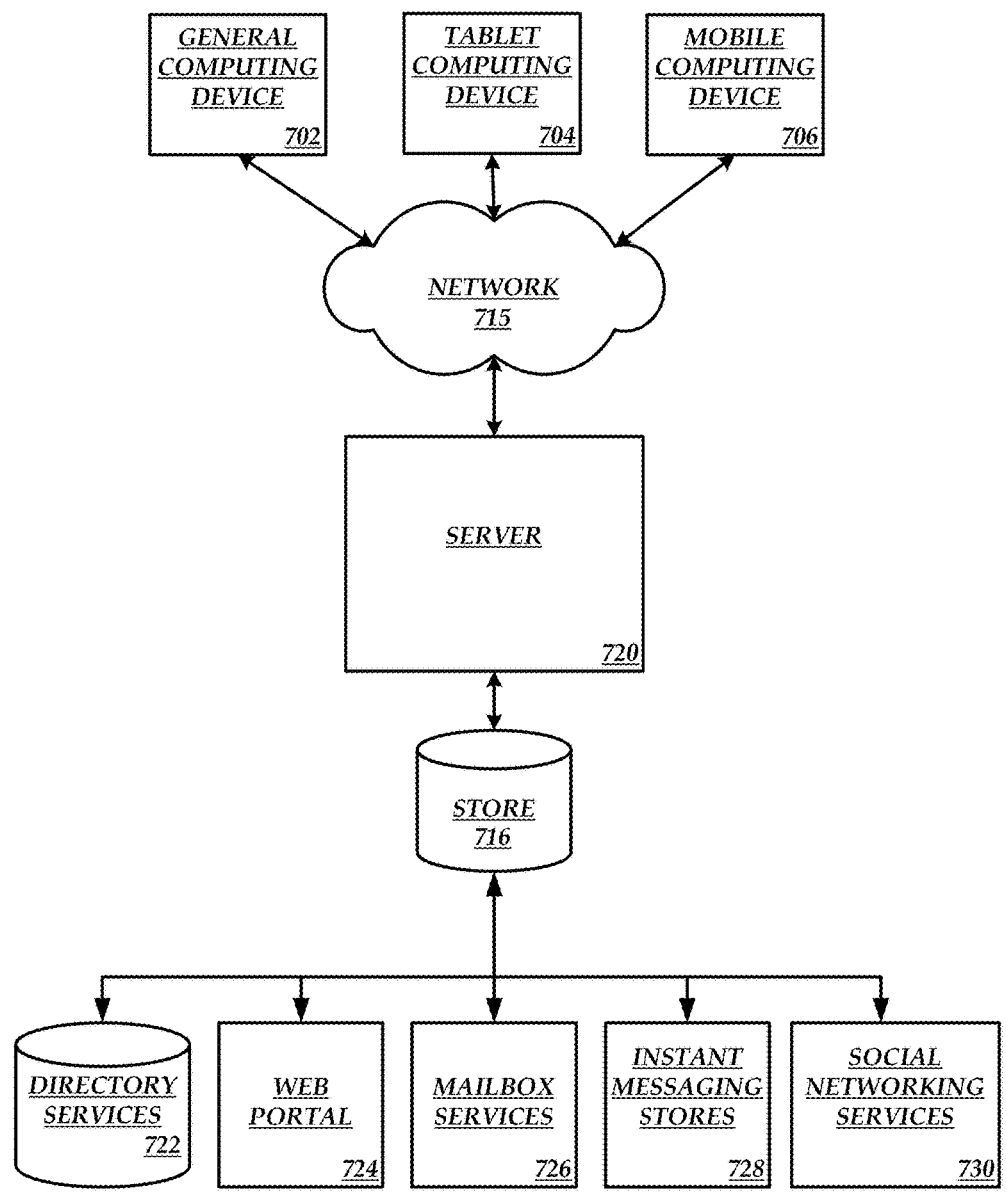
FIG. 7 illustrates one embodiment of an architecture of a system implementing notes preview features with one or more client devices.

FIG. 7 illustrates one embodiment of the architecture of a system implementing notes preview features with one or more client devices. Content, including notes page preview information may be stored in different communication channels or other storage types. For example, various information may be stored using a directory service 722, a web portal 724, a mailbox service 726, an instant messaging store 728, and/or a social networking site 730. A server 720 may provide various notes page preview features to communicating clients. As one example, the server 720 may be a synchronization server providing notes synchronization features over network 715, such as the Internet or other network for example. By way of example, the client computing device may be implemented as a general computing device 702 and embodied in a personal computer, a tablet computing device 704, and/or a mobile computing device 706 (e.g., a smart phone). Any of these clients may use content from the store 716.

Embodiments of the invention, for example, are described above with reference to block diagrams and/or operational illustrations of methods, systems, and computer program products. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

It should be appreciated that various embodiments can be implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as recited within the claims set forth herein.

Although the invention has been described in connection with various exemplary embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A method comprising:
    accessing a notetaking application to generate and display a source note page, wherein the notetaking application comprises at least one electronic notebook for organizing a plurality of source notes pages for interaction by a user, wherein the source notes page, of the plurality of source notes pages, is a note file of the notetaking application;
    extracting, from the generated source notes page, identified population information for generation of a notes page preview corresponding with the generated source notes page, wherein the identified population information comprises: a title from the source notes page, a thumbnail image generated from the source notes page when the generated source notes page includes an image or ink, and a snippet of text content of the source notes page when a body of the generated source notes page includes lines of text;
    generating the notes page preview based on the extracted identified population information; and
    displaying, within the notetaking application, the generated notes page preview,
    wherein the identified population information does not include the thumbnail image when the generated source notes page does not include an image or ink, and the identified population information does not include the snippet of content when the body of the generated source notes page does not include lines of text.

2. The method of claim 1, further comprising dynamically updating the notes page preview based on changes made in response to input received from a user to the corresponding source notes page.

3. The method of claim 2, further comprising receiving selection of the generated notes page preview, and navigating to a location of the source notes page within the at least one electronic notebook based on the received selection of the notes page preview.

4. The method of claim 1, further comprising providing the notes page preview to another application.

5. The method of claim 1, further comprising using a thumbnail population heuristic to generate a thumbnail from the source notes page to be displayed in a thumbnail display portion of the notes page preview.

6. The method of claim 5, further comprising using the thumbnail population heuristic to identify an image contained in the source notes page to be displayed in the thumbnail display portion of the notes page preview.

7. The method of claim 5, further comprising using the thumbnail population heuristic to identify user ink contained in the source notes page to be displayed in the thumbnail display portion of the notes page preview.

8. The method of claim 1, further comprising using a snippet population heuristic to generate a textual snippet from the source notes page to be displayed in a snippet display portion of the notes page preview.

9. The method of claim 8, further comprising using the snippet population heuristic to generate the textual snippet using an optical character recognition application on ink contained in the source notes page to be displayed in the snippet display portion of the notes page preview.

10. The method of claim 1, further comprising displaying, in the notes page preview, one or more selected from a group consisting of: a priority indication for the source notes page and an indication of sharing permission for the source notes page.

11. A handheld device comprising:
a display;
processing and memory resources;
a notes application interface configured to operate with the processing and memory resources in part to execute a notetaking application and to generate and display a source note page,
wherein the notetaking application comprises at least one electronic notebook for organizing a plurality of source notes pages for interaction by a user,
wherein the notes application interface is further configured to generate and display one or more notes page previews associated with the source notes page of the plurality of source notes pages,
wherein a notes page preview comprises a plurality of preview display portions that include: a title display portion to display a title generated from the source notes page, a thumbnail display portion to display a thumbnail image generated from the source notes page when the source notes page includes an image or ink, and a snippet portion to display a snippet of text content from the source notes page when a body of the source notes page includes lines of text, and wherein the notes application interface executes operations that comprise:
generating the notes page preview based on population data extracted from the source notes page, and
outputting the generated notes page preview for display; and
displaying on the display the notes page preview in a listing of notes page previews within the notes application,
wherein the population data extracted from the source notes page does not include the thumbnail image when the source notes page does not include an image or ink, and the population data extracted from the source notes does not include the snippet of text content when the body of the source notes page does not include lines of text.

12. The handheld device of claim 11, wherein the notes application interface uses a number of note page properties in part to populate each notes page preview, the number of properties including a title property, a snippet property, a thumbnail property, a location property, a starred property, an applied tags property, and a shared property.

13. The handheld device of claim 11, wherein the display is further configured to display each notes page preview including two or more of the title, a thumbnail, the snippet, a source location, a starred indicator, any applied tags, and a shared indicator.

14. The handheld device of claim 13, further configured to update the display of a notes page preview by updating one or more of the title, thumbnail, snippet, source location, starred indicator, any applied tags, and the shared indicator based on changes made in response to input received from a user to the corresponding source notes page.

15. The handheld device of claim 11, further configured to populate a snippet display portion or a thumbnail display portion using user ink input associated with the source notes page.

16. The handheld device of claim 11, configured as a smartphone, tablet computer, or other processor-based device.

17. A system comprising:
at least one processor; and
a memory operatively connected with the at least one processor, wherein the memory stores computer-executable instructions, which when executed by the at least one processor, that causes the at least one processor to execute a method that comprises:
accessing a notetaking application to generate and display a source note page, wherein the notetaking application comprises at least one electronic notebook for organizing a plurality of source notes pages for interaction by a user, wherein the source notes page, of the plurality of source notes pages, is a note file of the notetaking application,
extracting, from the generated source notes page, identified population information for generation of a notes page preview corresponding with the generated source notes page, wherein the identified population information comprises a title from the source notes page, a thumbnail image generated from the source notes page when the source notes page includes an image or ink, and a snippet of text content of the source notes page when a body of the source notes page includes lines of text,
generating the notes page preview based on the extracted identified population information,
displaying, within the notetaking application, the generated notes page preview, wherein the identified population information does not include the thumbnail image when the generated source notes page does not include an image or ink, and the identified population information does not include the snippet of content when the body of the generated source notes page does not include lines of text.

18. The system of claim 17, wherein the method, executed by the at least one processor, further comprises receiving selection of the notes page preview from the listing, and navigating to a location of the source notes page within the at least one electronic notebook based on the received selection of the notes page preview.

19. The system of claim 17, wherein the method, executed by the at least one processor, further comprises providing the notes page preview to another application.

20. The system of claim 17, wherein the notes page preview further comprises one or more selected from a group consisting of: a priority indication for the source notes page and an indication of sharing permission for the source notes page, and wherein the method, executed by the at least one processor, further comprises grouping the listing of notes page previews based on one or more of the priority indication and the sharing permission.

\* \* \* \* \*